US011409242B2

(12) United States Patent
Christmas et al.

(10) Patent No.: US 11,409,242 B2
(45) Date of Patent: Aug. 9, 2022

(54) HOLOGRAPHIC PROJECTOR

(71) Applicant: Dualitas Ltd., Milton Keynes (GB)

(72) Inventors: Jamieson Christmas, Milton Keynes (GB); Alexander Cole, Milton Keynes (GB)

(73) Assignee: DUALITAS LTD, Milton Keynes (GB)

( * ) Notice: Subject to any disclaimer, the term of this patent is extended or adjusted under 35 U.S.C. 154(b) by 320 days.

(21) Appl. No.: 16/051,945

(22) Filed: Aug. 1, 2018

(65) Prior Publication Data
US 2019/0041797 A1 Feb. 7, 2019

(30) Foreign Application Priority Data

Aug. 2, 2017 (GB) .................... 1712432

(51) Int. Cl.
*G03H 1/08* (2006.01)
*G03H 1/22* (2006.01)
(Continued)

(52) U.S. Cl.
CPC ......... *G03H 1/2294* (2013.01); *G02B 5/0205* (2013.01); *G02B 27/0172* (2013.01);
(Continued)

(58) Field of Classification Search
CPC ...... G03H 1/2294; G03H 1/2202; G03H 1/32; G03H 1/16; G03H 1/0005; G03H 1/2205;
(Continued)

(56) References Cited

U.S. PATENT DOCUMENTS

| 4,256,363 A | 3/1981 | Briones |
| 9,270,957 B2 | 2/2016 | Yoshida |
| (Continued) | | |

FOREIGN PATENT DOCUMENTS

| GB | 2 456 170 A | 8/2009 |
| GB | 2496108 A | 5/2013 |
| (Continued) | | |

OTHER PUBLICATIONS

Golan, Lior et al., "Speckle Elimination Using Shift-Averaging In High-Rate Holographic Projection," Optics Express, vol. 17, No. 3, dated Feb. 2, 2009, pp. 1330-1339.
(Continued)

*Primary Examiner* — Stephone B Allen
*Assistant Examiner* — Jyotsna V Dabbi
(74) *Attorney, Agent, or Firm* — McDonnell Boehnen Hulbert & Berghoff LLP

(57) ABSTRACT

A holographic projector includes a spatial light modulator, a light receiving member and a driver. The spatial light modulator is arranged to receive and represent a computer-generated hologram and spatially modulate light incident on the spatial light modulator to form a holographic reconstruction in accordance with the computer-generated hologram. The light receiving member is arranged to receive spatially modulated light along an optical axis from the spatial light modulator and the holographic reconstruction is formed on the light receiving member. The driver is coupled to the light receiving member to move the light receiving member in a plane. The driver is configured to move the light receiving member while maintaining an orientation of the light receiving member relative to the spatial light modulator substantially constant.

20 Claims, 10 Drawing Sheets

(51) Int. Cl.
| | | |
|---|---|---|
| *G02B 27/01* | (2006.01) | |
| *G02B 27/48* | (2006.01) | |
| *G03H 1/32* | (2006.01) | |
| *G02B 5/02* | (2006.01) | |
| *G03B 21/00* | (2006.01) | |
| *G03H 1/16* | (2006.01) | |

(52) U.S. Cl.
CPC ......... *G02B 27/0176* (2013.01); *G02B 27/48* (2013.01); *G03B 21/006* (2013.01); *G03B 21/008* (2013.01); *G03H 1/16* (2013.01); *G03H 1/2202* (2013.01); *G03H 1/32* (2013.01); *G02B 5/02* (2013.01); *G02B 27/0103* (2013.01); *G03H 2001/2218* (2013.01); *G03H 2001/2271* (2013.01); *G03H 2001/2297* (2013.01); *G03H 2223/14* (2013.01); *G03H 2227/03* (2013.01)

(58) Field of Classification Search
CPC ...... G03H 1/2286; G03H 1/22; G03H 1/2297; G03H 2001/2218; G03H 2001/2271; G03H 2001/2297; G03H 2001/221; G03H 2001/2215; G03H 2001/2213; G03H 2001/005; G03H 2001/2223; G03H 2223/14; G03H 2223/24; G03H 2227/03; G03H 2210/22; G02B 5/0205; G02B 5/02; G02B 5/32; G02B 5/203; G02B 5/0252; G02B 27/0172; G02B 27/0176; G02B 27/48; G02B 27/0103; G02B 27/017; G02B 27/0093; G02B 27/095; G02B 2027/014; G02B 2027/0178; G02B 2027/0138; G02B 2027/0174; G02B 2027/013; G02B 2027/0145; G02B 19/0014; G03B 21/006; G03B 21/008
USPC .......................................................... 359/9
See application file for complete search history.

(56) References Cited

U.S. PATENT DOCUMENTS

| | | | |
|---|---|---|---|
| 2006/0227293 A1 | 10/2006 | Kasazumi et al. | |
| 2006/0244918 A1 | 11/2006 | Cossairt et al. | |
| 2007/0171521 A1 | 7/2007 | Sugawara et al. | |
| 2008/0007827 A1* | 1/2008 | Kinoshita ............ G03B 21/625 | 359/446 |
| 2008/0252968 A1* | 10/2008 | Watanabe ................ G02B 3/08 | 359/446 |
| 2009/0009871 A1 | 1/2009 | Dunphy et al. | |
| 2009/0109530 A1 | 4/2009 | Michimori et al. | |
| 2010/0014134 A1 | 1/2010 | Cable | |
| 2010/0020395 A1 | 1/2010 | Watanabe et al. | |
| 2011/0002019 A1* | 1/2011 | Routley ................ H04N 9/3161 | 359/9 |
| 2012/0044553 A1 | 2/2012 | Kurashige | |
| 2013/0063754 A1* | 3/2013 | Saisho ............... G02B 19/0057 | 358/1.13 |
| 2013/0265622 A1 | 10/2013 | Christmas et al. | |
| 2014/0022526 A1 | 1/2014 | Van Eijk et al. | |
| 2014/0253987 A1 | 9/2014 | Christmas | |
| 2015/0085332 A1 | 3/2015 | Yoshida et al. | |
| 2015/0116799 A1 | 4/2015 | Someno | |
| 2015/0116800 A1 | 4/2015 | Yoshida et al. | |
| 2016/0209669 A1 | 7/2016 | Digel | |
| 2016/0320616 A1* | 11/2016 | Ichii ................... G02B 27/0179 | |
| 2016/0381329 A1 | 12/2016 | Damberg et al. | |
| 2017/0082855 A1 | 3/2017 | Christmas et al. | |
| 2017/0115627 A1 | 4/2017 | Christmas et al. | |
| 2017/0220106 A1 | 8/2017 | Tomiyama et al. | |
| 2017/0363869 A1 | 12/2017 | Christmas et al. | |
| 2018/0045958 A1 | 2/2018 | Kuzuhara et al. | |
| 2018/0046138 A1 | 2/2018 | Christmas et al. | |
| 2018/0120768 A1 | 5/2018 | Christmas | |
| 2018/0188532 A1 | 7/2018 | Christmas et al. | |
| 2019/0041641 A1 | 2/2019 | Christmas et al. | |
| 2019/0064738 A1 | 2/2019 | Cole et al. | |

FOREIGN PATENT DOCUMENTS

| | | | | |
|---|---|---|---|---|
| GB | 2 498 170 A | | 10/2013 | |
| GB | 2526275 A | | 11/2015 | |
| GB | 2 547 929 A | | 6/2017 | |
| GB | 2554575 A | | 4/2018 | |
| GB | 2567408 A | | 4/2019 | |
| GB | 2567409 A | | 4/2019 | |
| GB | 2567410 A | | 4/2019 | |
| GB | 2569206 A | | 6/2019 | |
| GB | 2569208 A | | 6/2019 | |
| JP | 2009210751 A | * | 9/2009 | ............ G03B 21/14 |
| JP | 2009210751 A | | 9/2009 | |
| JP | 2016114768 A | | 6/2016 | |
| WO | WO 2015/064496 A1 | | 5/2015 | |
| WO | WO 2015/064497 A1 | | 5/2015 | |
| WO | 2017022176 A1 | | 2/2017 | |
| WO | 2018078366 A1 | | 5/2018 | |
| WO | 2018100394 A1 | | 6/2018 | |
| WO | 2018100397 A1 | | 6/2018 | |
| WO | 2018150889 A1 | | 8/2018 | |

OTHER PUBLICATIONS

Co-Pending U.S. Appl. No. 15/565,828, filed Oct. 11, 2017.

* cited by examiner

HOLOGRAPHIC PROJECTOR

CROSS-REFERENCE TO RELATED APPLICATIONS

This application claims the benefit of priority under 35 U.S.C. § 119 of United Kingdom Patent Application 1712432.2, filed Aug. 2, 2017, which is hereby incorporated herein by reference in its entirety.

FIELD

The present disclosure relates to a projector and a picture generating unit. More specifically, the present disclosure relates to a holographic projector and picture generating unit. Some arrangements relate to a head-up display.

BACKGROUND

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector for imaging may be provided using the described technology. Such projectors have found application in head-up displays, "HUD", and head-mounted displays, "HMD", including near-eye devices, for example.

Since holography requires coherent light to illuminate the SLM, for example laser light, an undesirable side-effect is the appearance of laser speckle in the image (the holographic reconstruction), which degrades the quality of the image. To improve image quality, it would be desirable to reduce speckle in the holographic reconstruction.

SUMMARY

Aspects of the present disclosure are defined in the appended independent claim.

Specifically, in some aspects, a holographic projector comprises a spatial light modulator, a light receiving member and a driver. The spatial light modulator is arranged to receive and represent a computer-generated hologram and spatially modulate light incident on the spatial light modulator to form a holographic reconstruction in accordance with the computer-generated hologram. The light receiving member is arranged to receive spatially modulated light along an optical axis from the spatial light modulator and the holographic reconstruction is formed on the light receiving member. The driver is coupled to the light receiving member to move the light receiving member in a plane. The driver is configured to move the light receiving member while maintaining an orientation of the light receiving member relative to the spatial light modulator substantially constant. In other words, the driver is coupled to the light receiving member to translate the light receiving member in a plane while maintaining a substantially constant orientation of the light receiving member relative to the spatial light modulator.

In some aspects, a method for holographic projection includes: receiving and representing a computer-generated hologram on a spatial light modulator;

spatially modulating incident light with the spatial light modulator with the representation of the computer-generated hologram thereon; receiving the spatially-modulated light along an optical axis from the spatial light modulator on a light receiving member to form a holographic reconstruction on the light receiving member; and moving the light receiving member in a plane while maintaining an orientation of the light receiving member relative to the spatial light modulator substantially constant In some embodiments, the driver is coupled to the light receiving member to move the light receiving member in a plane normal to the optical axis. The driver is configured to move the light receiving member while maintaining an orientation of the light receiving member in the plane and relative to the spatial light modulator substantially constant. In other words, the driver is coupled to the light receiving member to translate the light receiving member in a plane normal to the optical axis while maintaining a substantially constant orientation of the light receiving member relative to the spatial light modulator.

The spatial light modulator and light receiving member may be parallel or non-parallel but, in all cases, the angle between the spatial light modulator and light receiving member is substantially constant during movement of the light receiving member. In some embodiments, the angle of incidence of light on the spatial light modulator is greater than zero. That is, the angle of incidence of light on the spatial light modulator is non-normal. FIG. 1, described in detail below, shows such an embodiment. In these embodiments, the plane in which the light receiving member moves may be normal to the optical axis from the spatial light modulator to the light receiving member. Alternatively, in these embodiments, the plane in which the light receiving member moves may be non-normal to the optical axis. The angle between the normal of the plane in which the light receiving member moves and the optical axis may be less than 20 degrees such as 5 to 15 degrees.

Advantageously, by moving the light receiving member, for example a diffuser or screen used either in reflection or transmission, the region of the light receiving member that is illuminated with the holographic reconstruction changes over time, thereby changing the pattern of speckle in the light of the holographic reconstruction that emanates from the light receiving member, for example towards other components of a projection system. This is because statistical imperfections in the light receiving member influence the pattern of speckle so that the pattern changes because a continuously changing set of imperfections is illuminated as the light receiving members moves. As the pattern of speckle changes over time, it is averaged by the optic system of a human observer, so that the appearance of speckle in the holographic reconstruction is reduced. Further, as the light receiving member is moved while substantially maintaining its orientation relative to the spatial light modulator, the required area of the light receiving member required to accommodate its movement while intercepting the holographic reconstruction is reduced compared to arrangements in which the orientation is allowed to vary (as in the case of a light receiving member rotating about its axis, for example). Additionally, maintenance of a substantially constant relative orientation facilitates the use of a light receiving member that diffuses light in a non-isotropic fashion, enabling the shape of the light cone corresponding to the holographic reconstruction to be adapted to the shape of any optics arranged to receive light from the light receiving member.

The driver may be configured to move the light receiving member in a variety of fashions. For example, the driver may be configured to reciprocate (i.e. move back and forth) the light receiving member. On the other hand, the driver may be configured to move the light receiving member without stopping. For example, the driver may be configured to move the light receiving member on a circular or ovoid trajectory or any other closed path trajectory. In some specific arrangements, this can for example be achieved by mounting the light receiving member on a stage eccentrically secured at either end to a respective rotating link member, for example a linear link or wheel. It will be appreciated that in some instances, the driver may instead be configured to move the light receiving member without maintaining its relative orientation to the spatial light modulator as described above. For example, more generally, the light receiving member may move on a trajectory, for example enclosing a non-zero area and/or wobbling in several directions, whether the orientation is maintained or not. Further, in some instances, the movement may consist of or have a component that is non-translational and associated with a change in the relative orientation, for example by spinning the light receiving member about an axis. In any case, the movement of the light receiving member can be said to scan a scan area on the light receiving member with the holographic reconstruction and the scan area may be less than or equal to 1.5, optionally 1.2, times the area or the holographic reconstruction. It will of course be appreciated that, since the holographic reconstruction is scanned across the light receiving member, the scan area will always be larger than the area on the light receiving member of the holographic reconstruction.

If the light receiving member moves non-continuously, that is it moves between positions at which it stops, for example reciprocating (i.e. moving back and forth) between two positions or wobbling between a number of positions, the speed profile of the light receiving member varies between zero or a minimum value when the light receiving member changes direction and a maximum value. To increase the number of statistically generated speckle patterns, the generation of the holographic reconstruction (including switching of a light source such as a laser and refreshing of the spatial light modulator) is synchronised with the movement of the light receiving member to avoid times at which the light receiving member speed is at zero or at its lowest, for example synchronising the generation of the holographic reproduction to illuminate the light receiving member when its speed is non-zero/non-minimal, such as times when the speed is at or near a maximum speed of the light receiving member. The laser illumination may be gated in sync with the movement of the light receiving member. For example, the laser may be gated such that there is no illumination when the speed is zero.

A perimeter shape of the holographic reconstruction on the light receiving member may be a scaled version of a perimeter shape of the light receiving member, so that the shapes of the light receiving member and of the holographic reconstruction (as well as in some cases of a further optical component receiving light from the light receiving member) are similar or corresponding. Alternatively or additionally, the light receiving member may be configured to diffuse light incident on it, specifically in some cases to diffuse light in a first direction by a first amount and to diffuse light in a second direction perpendicular to the first direction by a second amount greater than the first amount. The light receiving member may be arranged to illuminate an optical element configured to receive light from the diffuser and a dimension of the optical element in a third direction is smaller than a dimension of the optical element in a fourth direction perpendicular to the third direction. When the first direction is generally parallel to the third direction the cross-sectional shape of the light cone from the light receiving element is matched to that of the optical element. By matching the shapes of two or more of the array of pixels of the spatial light modulator, holographic reconstruction, light receiving member and one or more other optical elements, the size of the components involved can be optimised or reduced, providing advantageously space-saving arrangements.

The holographic projector may comprise a light source arranged to illuminate the spatial light modulator, wherein the light source emits spatially coherent light, and optionally substantially monochromatic, light, for example a laser. The spatial light modulator may be configured to spatially modulate a phase of light incident on the spatial light modulator and may be a liquid crystal on silicon spatial light modulator. The computer-generated hologram may correspond to a transformation of a picture corresponding to the holographic reconstruction, for example a Fourier or Fresnel transformation. The computer generated hologram may be a Fourier or Fresnel hologram, for example generated by a point cloud method.

The holographic projector may comprise a processor coupled to the spatial light modulator to provide the computer generated hologram to the spatial light modulator. The processor may be configured to generate the computer generated hologram. In some cases, the processor may be configured to synchronise the generation of the computer generated hologram, as described above.

The light receiving member may be one of a plurality of light receiving members spaced along the light path. Each of the plurality light receiving member may be switchable between a substantially transparent state to transmit light substantially unaltered and a diffusing state to diffuse light. Each of the plurality of light receiving members may be coupled to the or a respective driver for movement in a respective plane. The computer generated hologram may be one of a plurality of computer generated holograms, each comprising a respective holographic lens component to cause a respective holographic reconstruction to be formed on a respective one of the plurality of light receiving members.

Aspects of the disclosure extend to a vehicle comprising a holographic projector as described above. In these aspects, the holographic projector is configured to project the holographic reconstruction onto a windscreen of the vehicle. More generally, the present disclosure relates to a head-up-display comprising a holographic projector as described above.

Aspects of the disclosure also extend to a picture generating unit comprising a spatial light modulator, a light receiving member, such as a screen or diffuser, and a driver. The spatial light modulator is arranged to spatially modulate light incident on the spatial light modulator to form an image, for example a holographic reconstruction. The light receiving member is arranged to receive spatially modulated light along a light path from the spatial light modulator. The image is formed on the light receiving member. The driver is coupled to the light receiving member to move the light receiving member in a plane.

For example, the driver is configured to move the light receiving member while maintaining an orientation in the plane of the light receiving member relative to the spatial light modulator substantially constant, for example by reciprocating the light receiving member (that is the light receiving member reciprocates between two positions). Alternatively, the driver may be configured to move the light receiving member without stopping, for example on a circular or ovoid trajectory or any other closed path trajectory. In any case, it can be said that movement of the light receiving member sweeps a sweep area on the light receiving member with the image. It may be advantageous to minimise the sweep area. Beyond a certain size of sweep area, no further improvement in image quality is achieved. The ratio of sweep area to image area may be dependent on the size of the features (i.e. surface features) of the light receiving member which cause the diffusion. The ratio of sweep area to image area may be proportional to the size of the features of the light receiving member. If the feature size is too large, the image is not improved by movement of the light receiving member. The inventors have found that the sweep area may further advantageously be less than or equal to twice, or less than or equal to 1.5 or 1.2 times, an area of the image.

A perimeter shape of the holographic reconstruction on the light receiving member may be a scaled version of a perimeter shape of the light receiving member, thereby making good use of the space taken up by the light receiving member. Alternatively, the perimeter shape of the light receiving member may be selected to match the shape of the sweep area.

The light receiving member may be configured to diffuse light incident on it. The light receiving member is configured to diffuse light in a first direction by a first amount and to diffuse light in a second direction perpendicular to the first direction by a second amount greater than the first amount.

Aspects of the disclosure further extend to a head-up-display comprising a picture generating unit as described above, as well as to a vehicle, for example a car, with such a head-up display installed, for example to project the image onto a windscreen. Further, aspects of the disclosure extend to a holographic projector comprising a picture generating unit as described above.

The term "hologram" is used to refer to the recording which contains amplitude information or phase information, or some combination thereof, about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values.

It has been found that a holographic reconstruction of acceptable quality can be formed from a "hologram" containing only phase information related to the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will change the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

Although different arrangements and groups of arrangements may be disclosed separately in the detailed description which follows, any feature of any arrangement or group of arrangements may be combined with any other feature or combination of features of any arrangement or group of arrangements. That is, all possible combinations and permutations of features disclosed in the present disclosure are envisaged.

BRIEF DESCRIPTION OF THE DRAWINGS

Specific arrangements are described by way of example only with reference to the following figures.

The same reference numbers will be used throughout the drawings to refer to the same or like parts.

DETAILED DESCRIPTION

The present invention is not restricted to the arrangements described in the following but extends to the full scope of the appended claims. That is, the present invention may be embodied in different forms and should not be construed as limited to the described arrangements, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different arrangements may be partially or overall coupled to or combined with each other, and may be variously inter-operated with each other. Some arrangements may be carried out independently from each other, or may be carried out together in co-dependent relationship.

Optical Configuration

Figure 1:
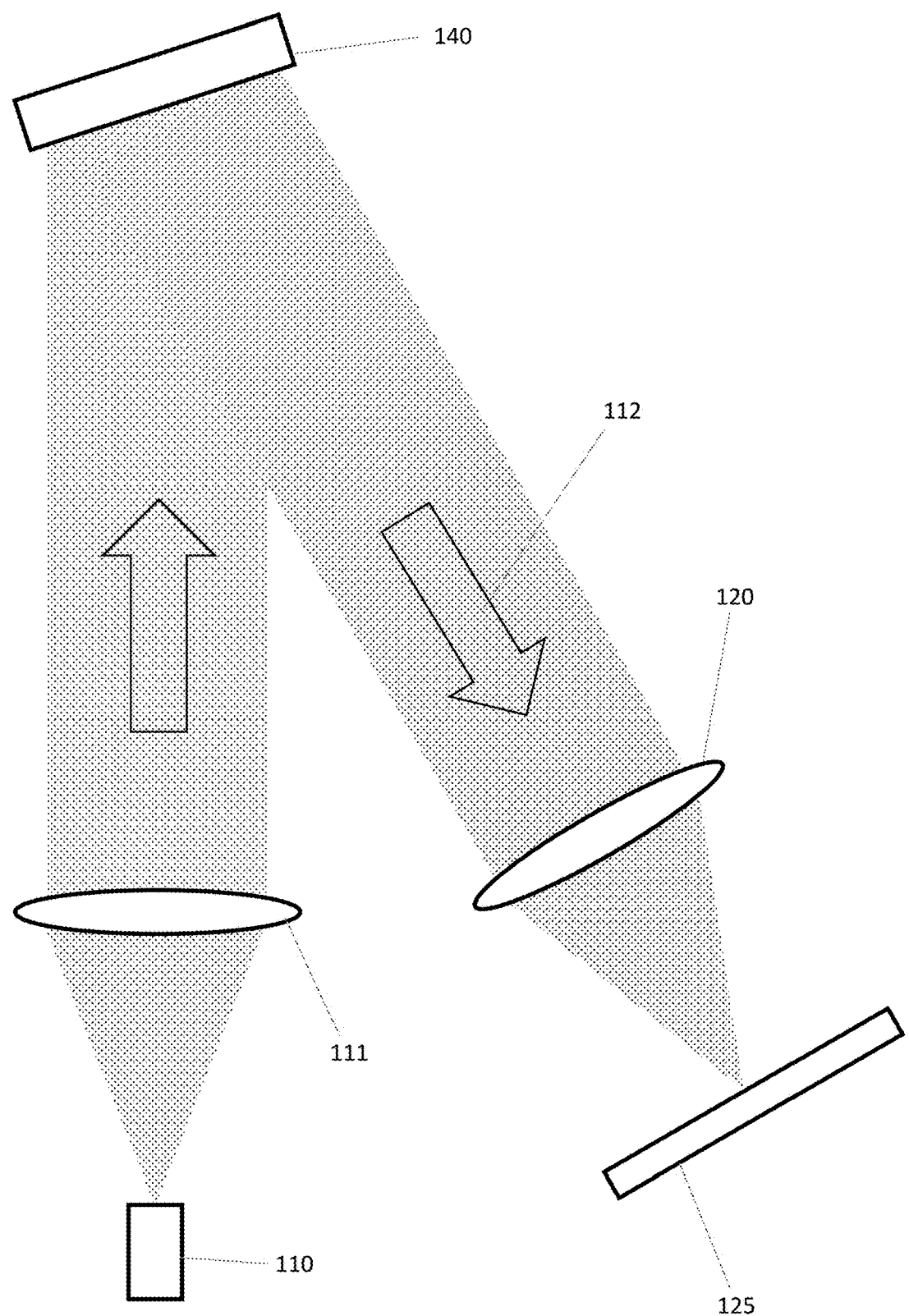
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving member or surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved" from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\Psi_A(x, y)$ and $\Psi_B(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\Psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\Psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
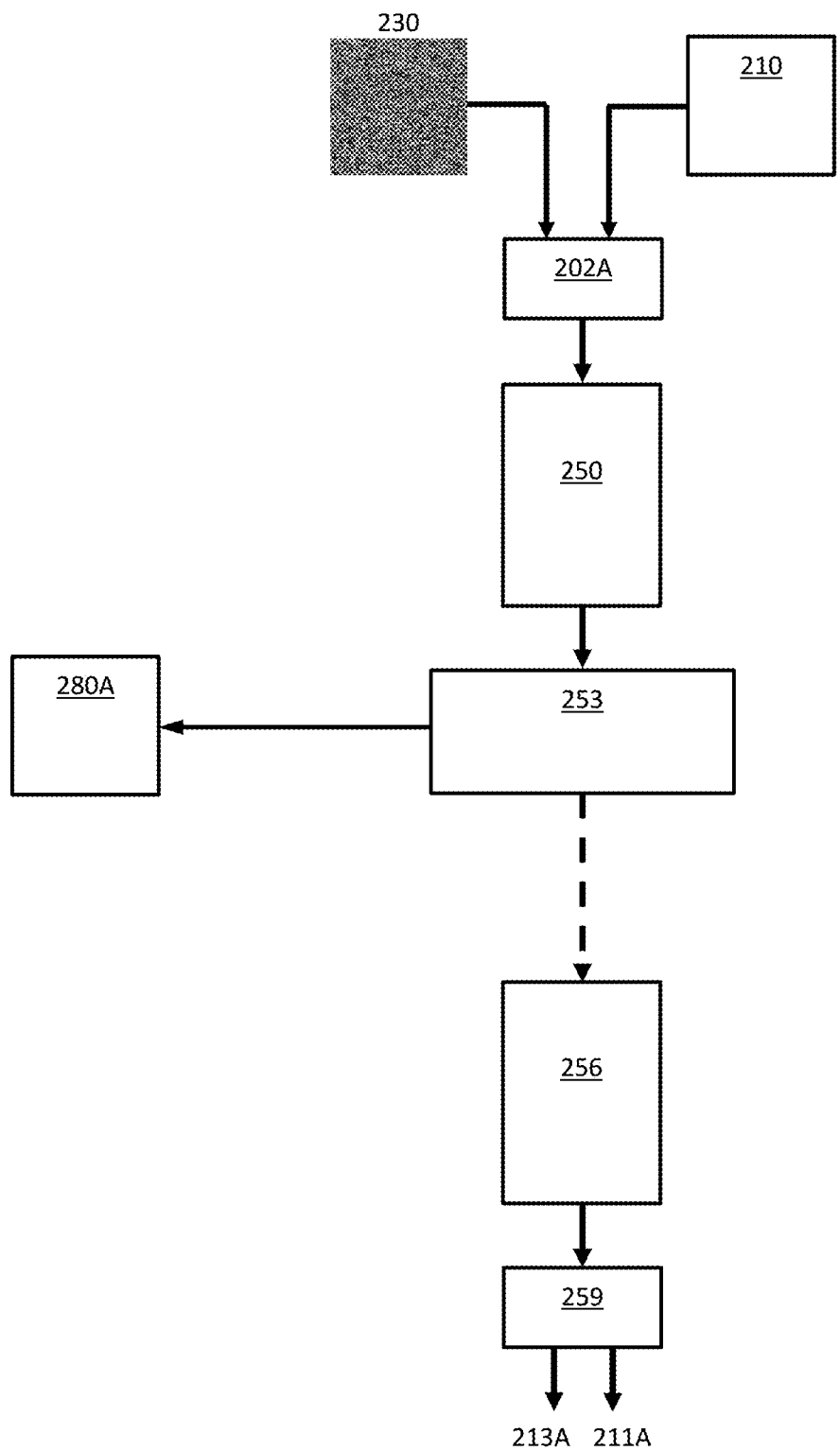
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may performed. However, this comparison step is not essential and in other embodiments, the number of iterations of the algorithm performed is predetermined or preset or user-defined.

Figure 2B:
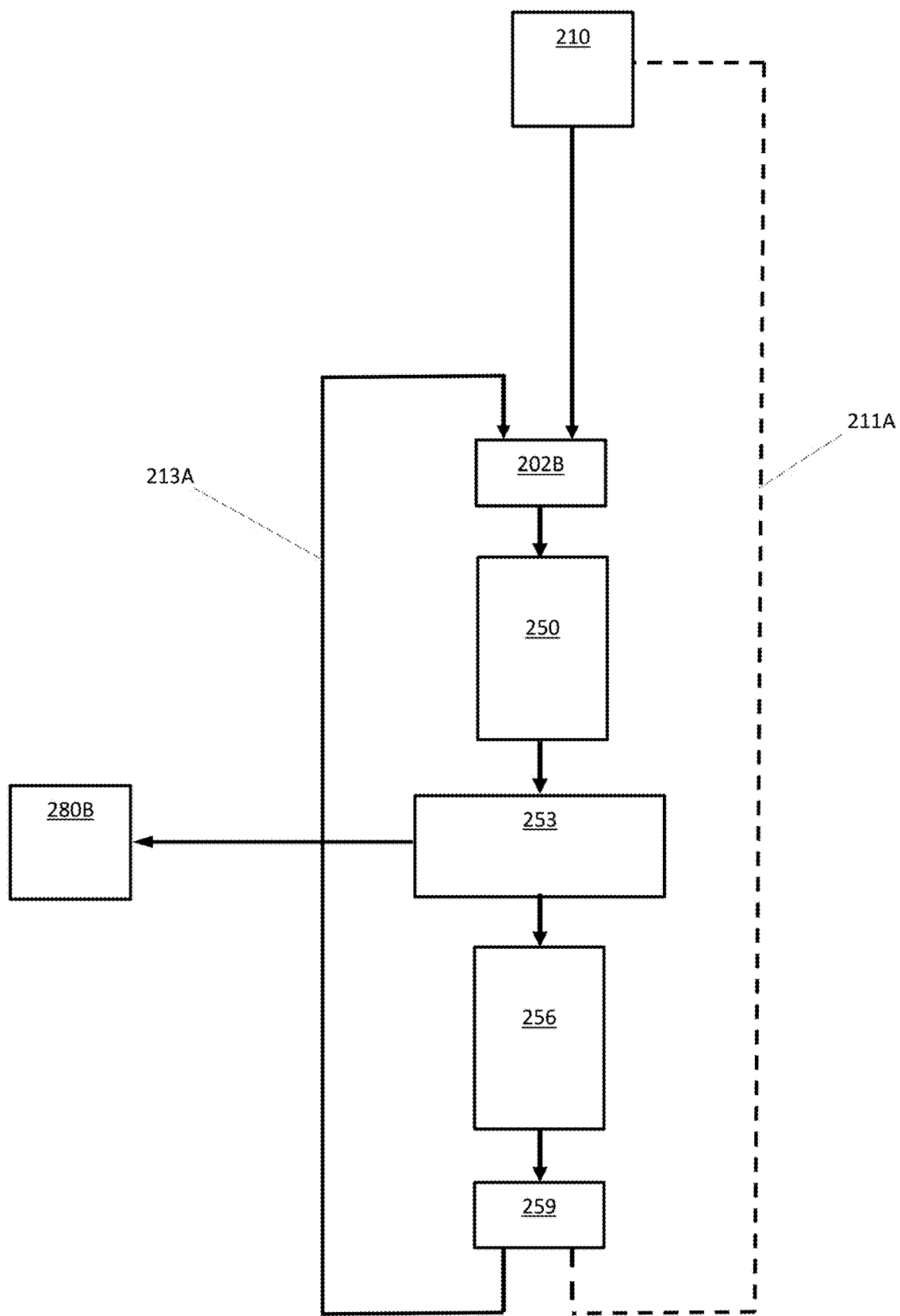
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
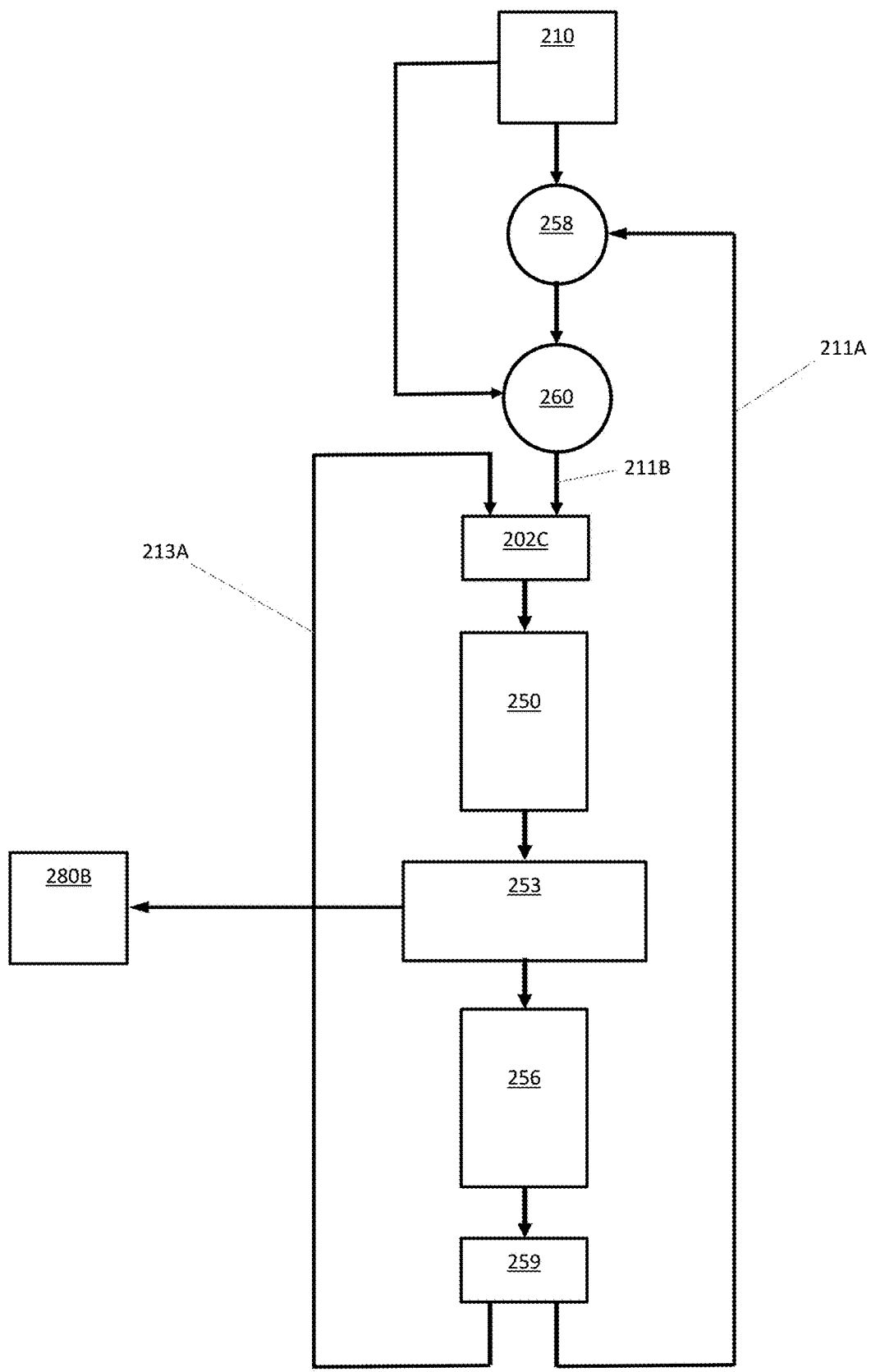
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y]=F'\{\exp(i\psi_n[u,v])\}$$

$$\psi_n[u,v]=\angle F\{\eta \cdot \exp(i\angle R_n[x,y])\}$$

$$\eta=T[x,y]-\alpha(|R_n[x,y]|-T[x,y])$$

where:
F' is the inverse Fourier transform;
F is the forward Fourier transform;
R[x, y] is the complex data set output by the third processing block 256;
T[x, y] is the input or target image;
∠ is the phase component;
Ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments the gain factor α is solely function of the iteration number.

The embodiment of FIG. 2C is the same as that of FIG. 2A and FIG. 2B in all other respects. It may be said that the phase-only hologram Ψ(u, v) comprises a phase distribution in the frequency or Fourier domain.

In some embodiments, the Fourier transform is performed computationally by including lensing data in the holographic data. That is, the hologram includes data representative of a lens as well as data representing the object. In these embodiments, the physical Fourier transform lens 120 of FIG. 1 is omitted. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length. For example, the optical path length at the centre of a convex lens is greater than the optical path length at the edges of the lens. An amplitude-only holographic lens may be formed by a Fresnel zone plate. It is also known in the art of computer-generated hologram how to combine holographic data representative of a lens with holographic data representative of the object so that a Fourier transform can be performed without the need for a physical Fourier lens. In some embodiments, lensing data is combined with the holographic data by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated holography how to calculate such holographic data and combine it with holographic data representative of the object. For example, a phase-only holographic grating may be formed by modelling the phase delay caused by each point on the surface of a blazed grating. An amplitude-only holographic grating may be simply superimposed on an amplitude-only hologram representative of an object to provide angular steering of an amplitude-only hologram.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and holograms calculated by other techniques such as those based on point cloud methods.

Light Modulation

A spatial light modulator may be used to display the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimeters in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
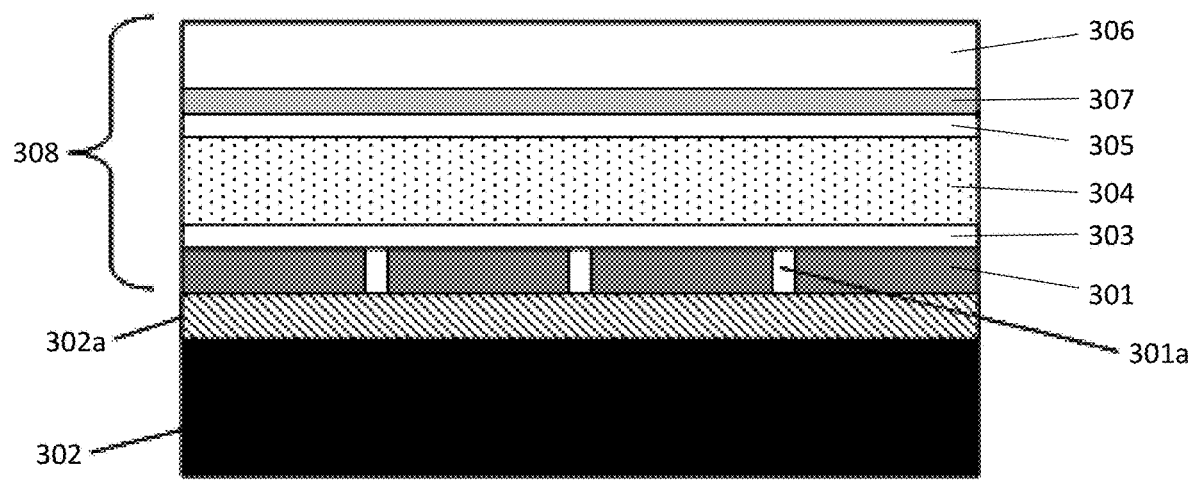
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Figure 4:
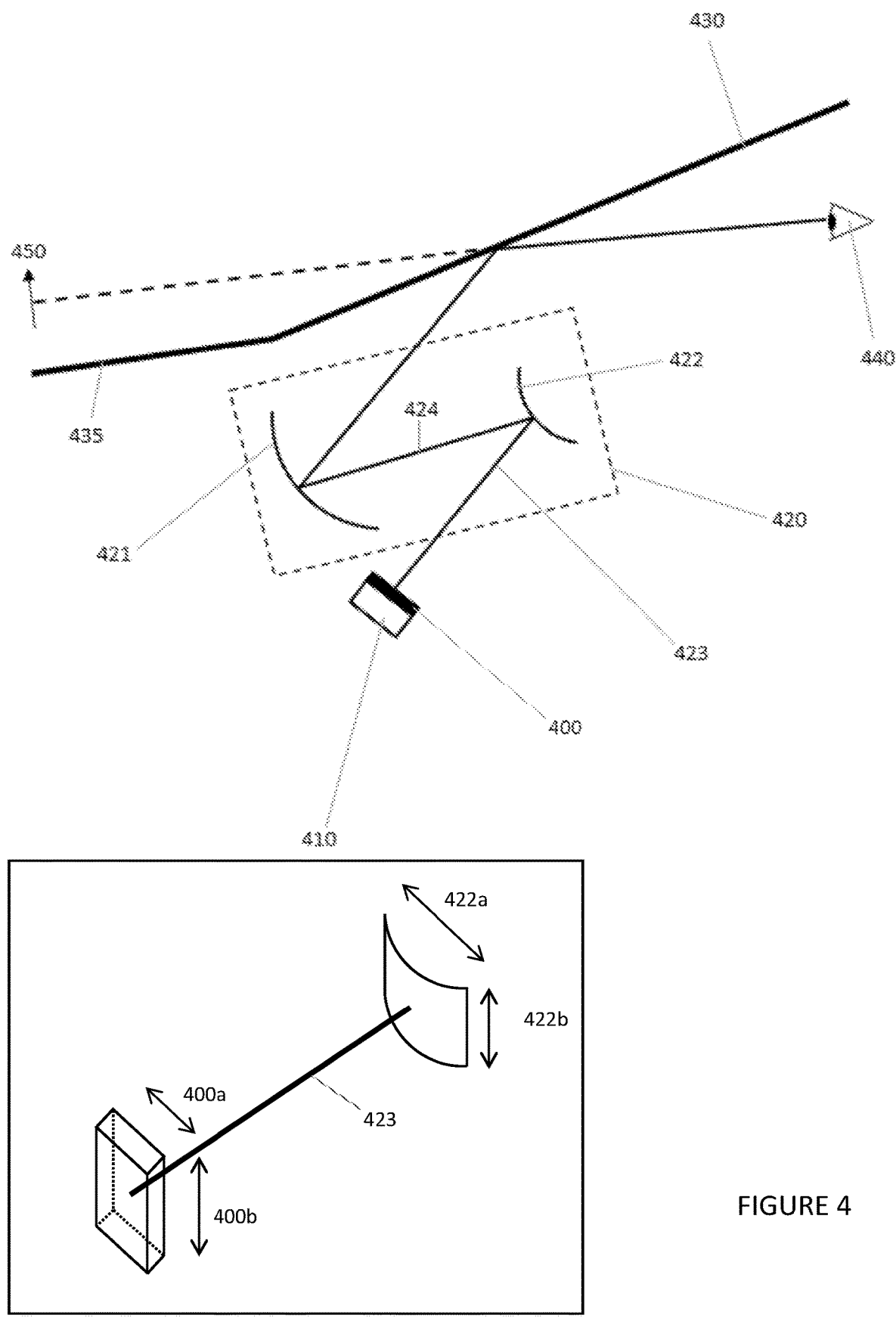
FIG. 4 shows a HUD installed in a vehicle.

Head-up display FIG. 4 shows a HUD in a vehicle such as a car. A windscreen 430 and bonnet (or hood) 435 of the vehicle are shown in FIG. 4. The HUD comprises a picture generating unit, "PGU", 410 and an optical system 420.

The PGU 410 comprises a light source (not shown), a light receiving member 400 and a processor (or computer, not shown) arranged to computer-control the image content of the picture. The PGU 410 is arranged to generate a picture, or sequence of pictures, on the light receiving member 400. The light receiving member 400 may be a screen or diffuser. In some embodiments, the light receiving member 400 is plastic (that is, made of plastic).

The optical system 420 comprises an input port, an output port, a first mirror 421 and a second mirror 422. The first mirror 421 and second mirror 422 are arranged to guide light from the input port of the optical system to the output port of the optical system. More specifically, the second mirror 422 is arranged to receive light of the picture from the PGU 410 and the first mirror 421 is arranged to receive light of the picture from the second mirror 422. The first mirror 421 is further arranged to reflect the received light of the picture to the output port. The optical path from the input port to the output port therefore comprises a first optical path 423 (or first optical path component) from the input to the second mirror 422 and a second optical path 424 (or second optical path component) from the second mirror 422 to the first mirror 421. There is, of course, a third optical path (or optical path component) from the first mirror to the output port but that is not assigned a reference numeral in FIG. 4. The optical configuration shown in FIG. 4 may be referred to as a "z-fold" configuration owing to the shape of the optical path.

The light receiving member 400, the second mirror 422 and the first optical path 423 between them are shown in perspective schematic view in the inset in the bottom left of FIG. 4. Here, the dimension of the light receiving member 400 in a first direction is indicated by reference numeral 400a, the dimension of the light receiving member 400 second direction perpendicular to the first direction is indicated by reference numeral 400b, the dimension of the mirror 422 in a third direction is indicated by reference numeral 422a, and the dimension of the mirror 422 in a fourth direction perpendicular to the third direction is indicated by reference numeral 422b. The first direction (i.e., of 400a) is generally parallel to the third direction (i.e., of 422a) and the second direction (i.e., of 400b) is generally parallel to the fourth direction (i.e., of 422b).

The HUD is configured and positioned within the vehicle such that light of the picture from the output port of the optical system 420 is incident upon the windscreen 430 and at least partially reflected by the windscreen 430 to the user 440 of the HUD. Accordingly, in some embodiments, the optical system is arranged to form the virtual image of each picture on the windscreen by reflecting spatially-modulated light off the windscreen. The user 440 of the HUD (for example, the driver of the car) sees a virtual image 450 of the picture in the windscreen 430. Accordingly, in embodiments, the optical system is arranged to form a virtual image of each picture on a windscreen of the vehicle. The virtual image 450 is formed a distance down the bonnet 435 of the car. For example, the virtual image may be 1 to 2.5 metres from the user 440. The output port of the optical system 420 is aligned with an aperture in the dashboard of the car such that light of the picture is directed by the optical system 420 and windscreen 430 to the user 440. In this configuration, the windscreen 430 functions as an optical combiner. In some embodiments, the optical system is arranged to form a virtual image of each picture on an additional optical combiner which is included in the system. The windscreen 430, or additional optical combiner if included, combines light from the real world scene with light of the picture. It may therefore be understood that the HUD may provide augmented reality including a virtual image of the picture. For example, the augmented reality information may include navigation information or information related to the speed of the automotive vehicle. In some embodiments, the light forming the picture is output by incident upon the windscreen at substantially Brewster's angle (also known as the polarising angle).

In some embodiments, the first mirror and second mirror are arranged to fold the optical path from the input to the output in order to increase the optical path length without overly increasing the physical size of the HUD.

The picture formed on the light receiving member of the PGU 410 may only be a few centimetres in width and height. The first mirror 421 and second mirror 422 therefore, collectively or individually, may provide magnification. That is, the first mirror and/or second mirror may have optical power (that is, dioptric or focusing power). The user 440 therefore sees a magnified virtual image 450 of the picture formed by the PGU. The first mirror 421 and second mirror 422 may also correct for optical distortions such as those caused by the windscreen 430 which typically has a complex curved shape. The folded optical path and optical power in the mirrors together allow for suitable magnification of the virtual image of the picture and determination of the virtual distance.

The PGU 410 of the present disclosure may be part of a holographic projector. In accordance with the disclosure above, the holographic projector comprises a light source, a spatial light modulator and a hologram processor. The spatial light modulator is arranged to spatially-modulate light in accordance with holograms represented on the spatial light modulator. The hologram processor is arranged to provide the computer-generated holograms. In some embodiments, the hologram processor selects a computer-generated hologram for output from a repository (e.g. memory) comprising a plurality of computer-generated holograms. In other embodiments, the hologram processor calculates and outputs the computer-generated holograms in real-time. In some embodiments, each picture formed by the PGU 410 is a holographic reconstruction on the light receiving member 400. That is, in some embodiments, each picture is formed by interference of the spatially-modulated light at the light receiving member 400.

The dashboard of the vehicle comprises an aperture because the HUD requires an optical path (preferably, an unobstructed optical path) to the windscreen.

Light Receiving Member

Figure 5:
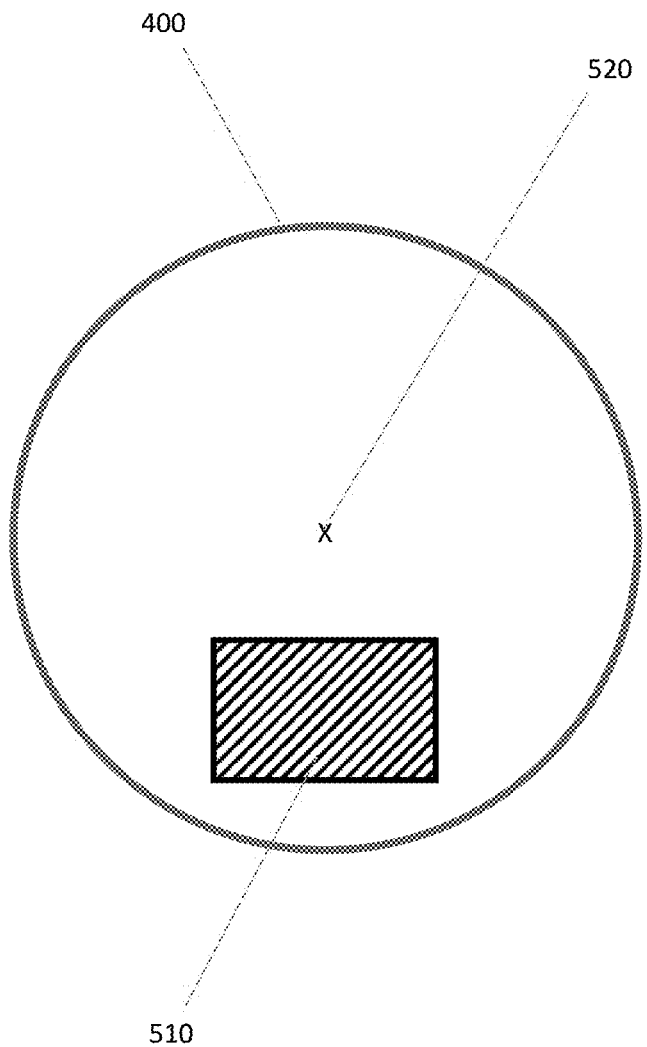
FIG. 5 shows an arrangement for moving a light receiving member.

With reference to FIG. 5, there is shown a light receiving member 400 on which a holographic reconstruction 510 is formed. The light receiving member 400 is arranged to rotate about an axis 520, for example driven by a motor. In a specific example, the holographic reconstruction 510 is rectangular and has a width of a few centimetres, and the disc shaped like light receiving member 400 has a radius of 2 or 3 times the width of the holographic reconstruction 510. The light receiving member 400 may be spun about the axis 520 at a rate between 100-8000 rpm, optionally 200-4000 rpm or more specifically 300-2000 rpm. In some arrangements, rather than spinning continuously, the light receiving member 400 may angularly reciprocate over a range of angles to scan the holographic reconstruction 510 across the light receiving member 400.

Figure 6A:
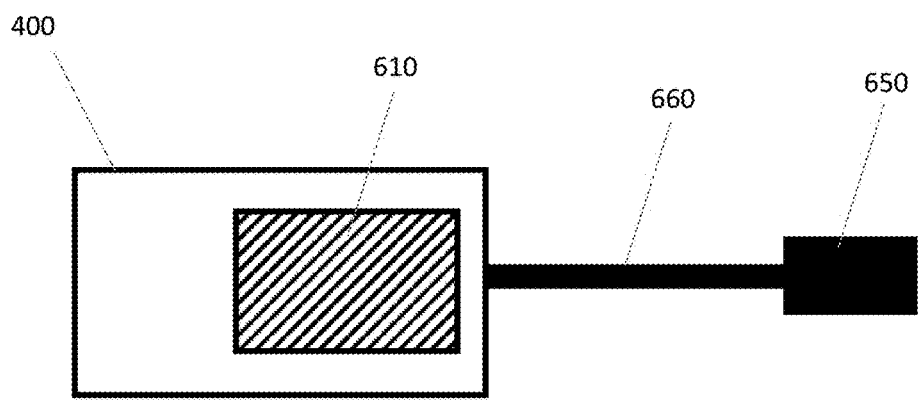
FIGS. 6A-C show another arrangement for moving a light receiving member.
Figure 6B:
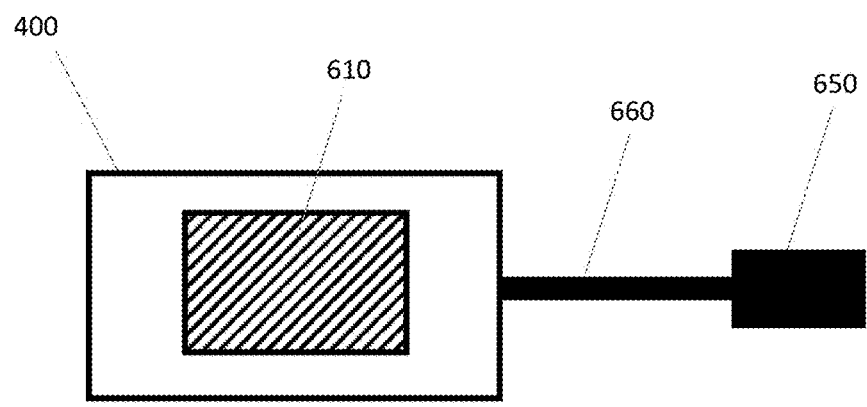
Figure 6C:
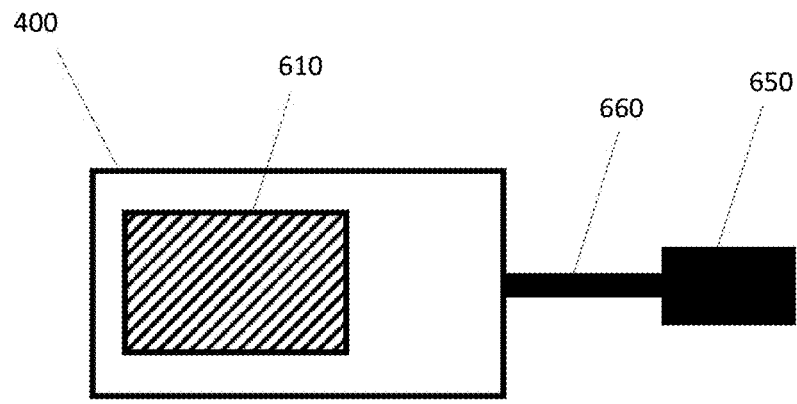

With reference to FIGS. 6A, 6B and 6C, the light receiving member 400 has a rectangular shape and is coupled to a linear motor 650 by an arm 660. The linear motor 650 and arm 660 provide a driver to reciprocate the light receiving member 400 back and forth, moving the light receiving member 400 back and forth linearly along a direction on a plane. In some embodiments, the plane is normal to the optical axis of the system. In other embodiments, the plane is at an angle—such as less than 20 degrees—to the optical axis of the system. More specifically, in the other embodiments, the angle between the normal of the plane and the optical axis of the system is less than 20 degrees. As the light receiving member 400 reciprocates back and forth, the holographic reconstruction 610 is scanned across the light receiving member 400.

In some specific arrangements, the linear motor 650 may be provided by a coil and armature arrangement such as in a voice or speaker coil, for example with an excursion of a few millimetres between the extreme positions of the reciprocating movement. Other types of linear motors are equally envisaged, as are arrangements comprising a rotary motor coupled by a suitable transmission linkage, such as a cam arrangement. In a specific example, the holographic reconstruction is rectangular and a few centimetres in width, and the light receiving member 400 is just one centimetre or so larger than the holographic reconstruction. The light receiving member 400 may be reciprocated back and forth at the rate of, for example, 2-200 Hz, optionally 5-120 Hz or more specifically 10-100 Hz.

FIGS. 6A, 6B and 6C illustrate the light receiving member 400 at or near a left-most, middle- and right-most position, respectively, of the reciprocating movement. As will be appreciated, the speed of the light receiving member 400 varies during this movement between zero at the left- and right-most positions and a maximum speed at a point between these two positions, typically around the middle of the movement as illustrated in FIG. 6B. In some arrangements, the holographic projector, specifically the processor, is configured to synchronise the generation of the holographic reconstruction 610 with the movement of the light receiving member 400 such that the holographic reconstruction 610 is generated when the light receiving member 400 travels at or near maximum velocity, for example when it passes through the middle position illustrated in FIG. 6B. Specifically, the processor may synchronise with one or more of a gate signal to gate the light source, a refresh signal refreshing the SLM, or similar signals with a signal driving the linear motor 650, or vice versa.

Considering the geometry of the light receiving member 400 shown in FIG. 6 as compared to the light receiving member 400 shown in FIG. 5, it will be appreciated that a more space efficient arrangement is possible in which the space required to accommodate the light receiving member 400 is reduced. Furthermore, the orientation of the light receiving member 400 in FIG. 6 is maintained during movement. Notably, in these embodiments, the light receiving member 400 may be more diffuse in one direction than another direction. This is advantageous, for example, when the holographic reconstruction has a first aspect ratio (e.g. is not square such as rectangular) and a mirror (e.g. mirror 422 of FIG. 4) having a second aspect ratio different to (e.g. greater than) the first aspect ratio is arranged to receive light from the light receiving member. That is, embodiments in which the footprint of the holographic reconstruction on the light receiving member defines a shape with a perimeter having a first aspect ratio and the perimeter of the mirror (e.g. mirror 422 of FIG. 4) defines a shape having a second aspect ratio different to (e.g. greater than) the first aspect ratio.

A further arrangement which combines the advantages of constant orientation with the advantages of continuous movement, is now described with reference to FIGS. 7A, 7B, 7C, 7D, 7E and 7F.

Figure 7A:
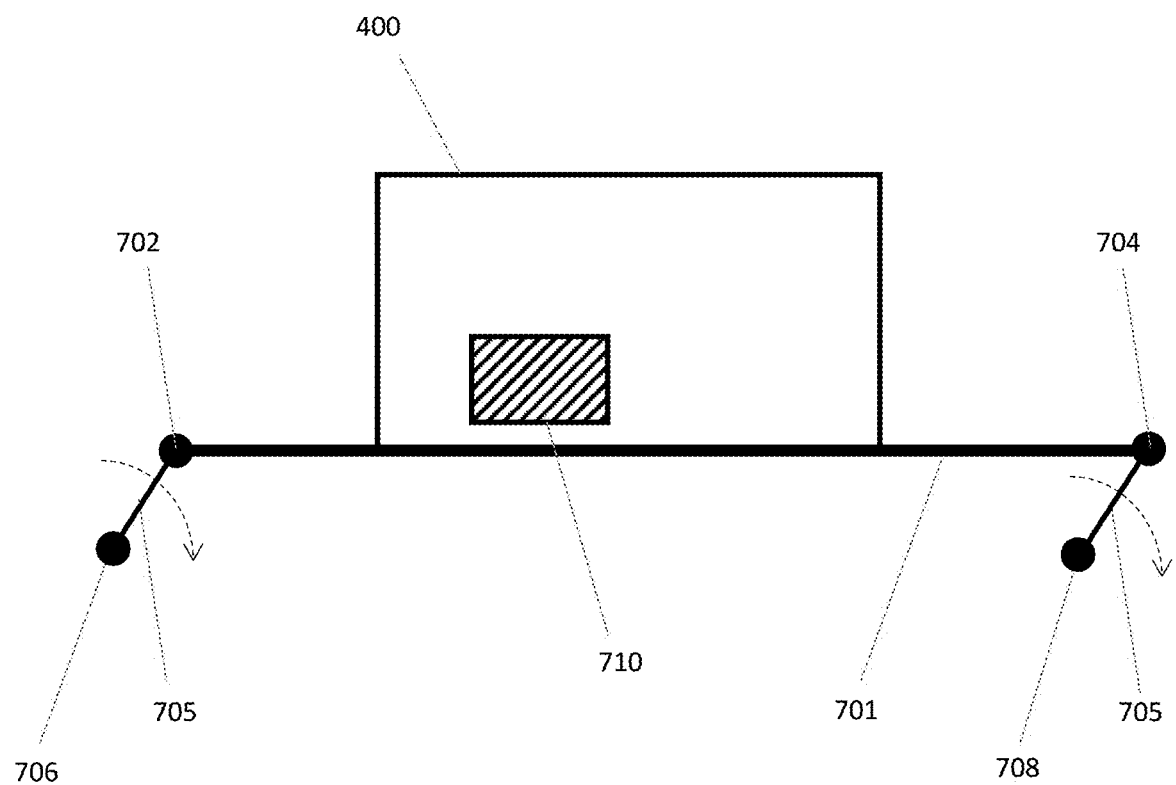
FIGS. 7A-F shows a further arrangement for moving a light receiving member.
Figure 7B:
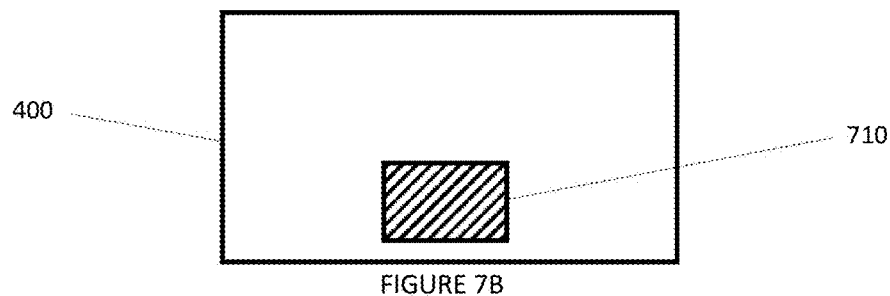
Figure 7C:
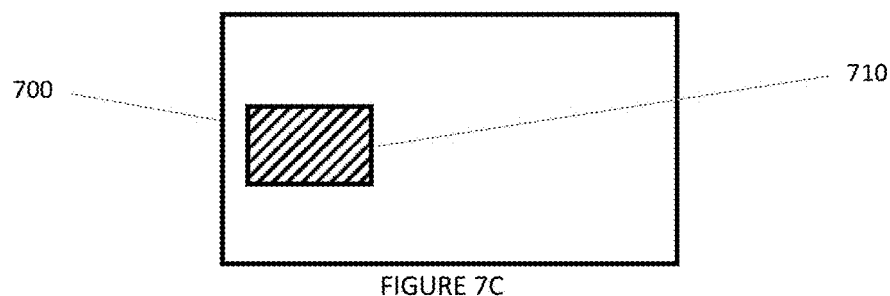
Figure 7D:
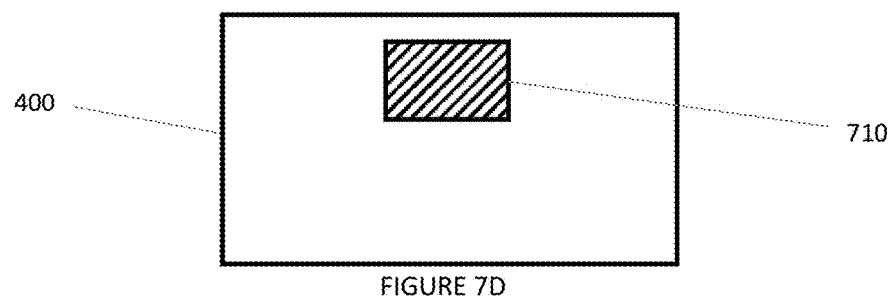
Figure 7E:
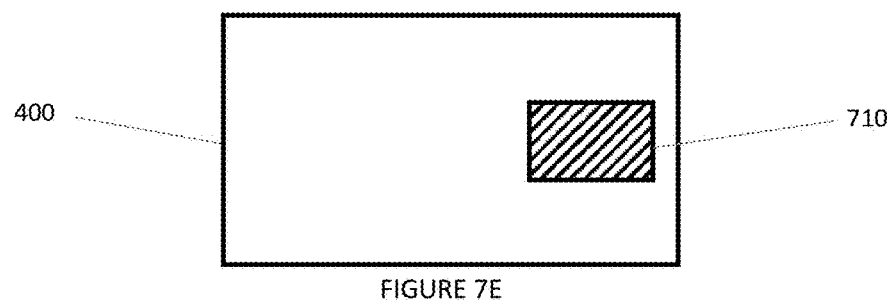
Figure 7F:
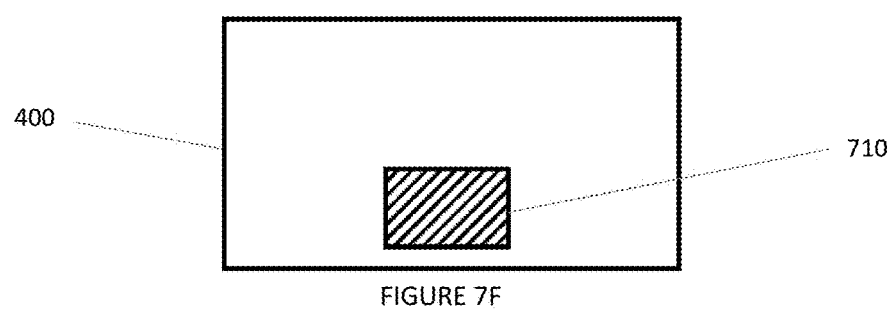

In the arrangement illustrated in FIG. 7A, the light receiving member 400 has a rectangular shape on which a holographic reconstruction 710 is formed. It will, of course, be appreciated that the shape of the light receiving member 400 (or the outline of the light receiving member 400) need not be rectangular but could have any suitable shape, for example an ovoid, specifically elliptic, shape. As long as the light receiving member 400 has a degree of similarity with the shape of the holographic reconstruction 710, a certain space-saving benefit can be reaped, in particular if the aspect ratios or major/minor axes of the light receiving member 400 and holographic reconstruction 710 are substantially aligned. It will be appreciated that the same remarks are applicable to the arrangements disclosed above with reference to FIGS. 6A, 6B and 6C.

The light receiving member 400 is mounted on a stage 701, for example a rigid rod or other rigid member. The stage 701 has respective pivot joints 702, 704 at either end, linking the stage 701 to respective link members 705 at one end of the link members 705. The link members 705 are coupled to respective axes 706 and 708 about which the link members can rotate. A driving arrangement, such as an electric motor, with or without a suitable transmission, is coupled to each axis 706, 708 to drive rotation of the link members 705. In some arrangements, a single motor drives both link members 705 using a suitable transmission arrangement. The link members may be simple linear links or rods as illustrated in FIG. 7A or may be provided in the shape of wheels with the axes 702, 704 connected eccentrically to the wheels.

With reference to FIGS. 7B, 7C, 7D, 7E and 7F, as the link members 705 rotate about their respective axis 706, 708, the light receiving member 400 follows a trajectory that corresponds to the trajectory of the axes 702, 704 that is a circular trajectory in the arrangement of FIG. 7A. In other arrangements, the trajectory may be ovoid, specifically elliptic, for example by using suitable link members 705 that comprise a telescopic gear mechanism that changes the length of the link members 705 in synchrony with rotation about the axis 706, 708. An example of such an ovoid, specifically elliptic, trajectory is illustrated in FIGS. 7B, 7C, 7D, 7E and 7F. As illustrated, the holographic reconstruction 710 moves across the light receiving member 400, although in reality it is the holographic reconstruction 710 that stays fixed in space, at least in some arrangements, while the light receiving member 400 moves relative to holographic reconstruction 710.

While the above description refers to regular patterns of movement for the light receiving member 400, any type of movement may be used instead, in particular those that do not change the orientation of the light receiving member 400 in a plane, relative to the SLM. Examples of such other movements could be a random wobble or warble. The light receiving member 400 may be a diffuser arranged to diffuse light incident on it and may be operated in transmission or reflection. Any suitable commercially available material may be used, for example polycarbonate sheets which are widely available. A suitable diffusing angle for such material may be 30°.

In some embodiments, the light receiving member has a diffusing angle of 5-20° in a first direction and 10-60° in a second direction, wherein the second direction is substantially orthogonal to the first direction. In some embodiments, the diffusing angle in the second direction is 1.2 to 5 times the diffusing angle in the first direction, optionally 2 to 4 times, further optionally 2.5 to 3.5 times.

It can be noted that the described arrangements form a real image (the holographic reconstruction) on the light receiving member, from where the image is transmitted onwards, for example to form a virtual image using suitable optical elements. By image formation on a diffuser, the so-called "eye-box" but can be enlarged, enabling the virtual image to be viewed from a wider range of viewing angles. This can be contrasted with so-called "direct-view" arrangements in which a viewer directly views the SLM and the holographic reconstruction is formed by the lens of the viewer's eye.

In some arrangements, the depth at which the virtual image is formed is controlled by controlling the depth position along the optical axis of the holographic reconstruction using lensing data as described above. To coincide with the holographic reconstruction, in some arrangements, the light receiving member 400 is moved along the optical axis to coincide with the holographic reconstruction or other optics are included to change the optical path length such that multiple possible replay planes are provided. In other arrangements, the light receiving member 400 is one of a plurality of light receiving members spaced along the optical axis and is controlled to be diffusing while the remaining light receiving members are controlled to be transparent, for example by use of electroactive material for the light receiving members. The light receiving members may be driven to move by a common driving arrangement or by a respective driving arrangement each. In either case, the driving arrangement may be configured as described above.

Additional Features

Embodiments refer to an electrically-activated LCOS spatial light modulator by way of example only. The teachings of the present disclosure may equally be implemented on any spatial light modulator capable of displaying a computer-generated hologram in accordance with the present disclosure such as any electrically-activated SLMs, optically-activated SLM, digital micromirror device or microelectromechanical device, for example.

In some embodiments, the light source is a laser. In some embodiments, the light receiving member is a screen or a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focused at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the size of the hologram is less than the size of the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator.

The size of the holographic replay field (i.e. the physical or spatial extent of the holographic reconstruction) is determined by the pixel spacing of the spatial light modulator (i.e. the distance between adjacent light-modulating elements, or pixels, of the spatial light modulator). The smallest feature which may be formed in the replay field may be called a "resolution element", "image spot" or an "image pixel". Typically, each pixel of the spatial light modulator has a quadrangular shape. The Fourier transform of a quadrangular aperture is a sinc function and therefore each image pixel is a sinc function. More specifically, the spatial intensity distribution of each image pixel on the replay field is a sinc function. Each sinc function may be considered as comprising a peak-intensity primary diffractive order and a series of decreasing-intensity higher diffractive orders extending radially away from the primary order. The size of each sinc function (i.e the physical or spatial extent of each sinc function) is determined by the size of the spatial light modulator (i.e. the physical or spatial extent of the aperture formed by the array of light-modulating elements or spatial light modulator pixels). Specifically, the larger the aperture formed by the array of light-modulating pixels, the smaller the image pixels. It is usually desirable to have small image pixels.

In some embodiments, the technique of "tiling" is implemented to increase image quality. Specifically, some embodiments implement the technique of tiling to minimise the size of the image pixels whilst maximising the amount of signal content going into the holographic reconstruction.

In some embodiments, the holographic pattern written to the spatial light modulator comprises at least one whole tile (that is, the complete hologram) and at least one fraction of a tile (that is, a continuous subset of pixels of the hologram).

The holographic reconstruction is created within the zeroth diffraction order of the overall window defined by the spatial light modulator. It is preferred that the first and subsequent orders are displaced far enough so as not to overlap with the image and so that they may be blocked using a spatial filter.

In embodiments, the holographic reconstruction is colour. In examples disclosed herein, three different colour light sources and three corresponding SLMs are used to provide composite colour. These examples may be referred to as spatially-separated colour, "SSC". In a variation encompassed by the present disclosure, the different holograms for each colour are displayed on different area of the same SLM and then combining to form the composite colour image. However, the skilled person will understand that at least some of the devices and methods of the present disclosure are equally applicable to other methods of providing composite colour holographic images.

One of these methods is known as Frame Sequential Colour, "FSC". In an example FSC system, three lasers are used (red, green and blue) and each laser is fired in succession at a single SLM to produce each frame of the video. The colours are cycled (red, green, blue, red, green, blue, etc.) at a fast enough rate such that a human viewer sees a polychromatic image from a combination of the images formed by three lasers. Each hologram is therefore colour specific. For example, in a video at 25 frames per second, the first frame would be produced by firing the red laser for 1/75th of a second, then the green laser would be fired for 1/75th of a second, and finally the blue laser would be fired for 1/75th of a second. The next frame is then produced, starting with the red laser, and so on.

An advantage of FSC method is that the whole SLM is used for each colour. This means that the quality of the three colour images produced will not be compromised because all pixels of the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact.

An advantage of the SSC method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced. Embodiments utilise the improved SSC technique disclosed in British patent 2,496, 108 which is hereby incorporated in its entirety by reference.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A holographic projector comprising:
   a light source;
   a spatial light modulator arranged to receive and represent a computer-generated hologram and spatially modulate light received by the spatial light modulator from the light source to form a holographic reconstruction in accordance with the computer-generated hologram;
   a light receiving member arranged to receive and to non-isotropically diffuse spatially modulated light along an optical axis from the spatial light modulator, wherein the holographic reconstruction is formed on the light receiving member and wherein the light receiving member is configured to diffuse light by a first length in first direction of the light receiving member and to diffuse light in a second direction of the light receiving member, perpendicular to the first direction, by a second length greater than the first length;
   a driver coupled to the light receiving member to move the light receiving member in a plane, wherein the driver is configured to move the light receiving member while maintaining an orientation of the light receiving member relative to the spatial light modulator substantially constant; and
   an optical element configured to receive light from the light receiving member, wherein a dimension of the optical element in a third direction is smaller than a dimension of the optical element in a fourth direction, the third direction being perpendicular to the fourth direction,
   wherein the first direction is generally parallel to the third direction and the second direction is generally parallel to the fourth direction, and wherein the cross-sectional shape of a light cone received by the optical element from the light receiving member is matched to a cross-sectional shape of the optical element, and
   wherein the driver is configured to move the light receiving member such that it scans a scan area on the light receiving member with the holographic reconstruction, said scan area being larger than the area on the light receiving member of the holographic reconstruction.

2. A holographic projector according to claim 1, wherein the driver is configured to reciprocate the light receiving member.

3. A holographic projector according to claim 2, wherein the light receiving member is secured to an arm connected to an arrangement for reciprocating the arm in a direction normal to the optical axis.

4. A holographic projector according to claim 1, wherein the driver is configured to move the light receiving member without stopping.

5. A holographic projector according to claim 1, wherein the driver is configured to move the light receiving member on a closed path trajectory.

6. A holographic projector according to claim 5, wherein the driver comprises two rotatable link members arranged for rotation about a respective axis each having a coupling at substantially a same radius from the respective axis, each coupling connecting the light receiving member to the respective link member with the couplings spaced apart along the light receiving member by substantially a same distance as the respective axes are spaced apart.

7. A holographic projector according to claim 1, wherein movement of the light receiving member scans a scan area on the light receiving member with the holographic reconstruction and the scan area is less than or equal to 1.5 times an area of the holographic reconstruction.

8. A holographic projection according to claim 1, wherein a perimeter shape of the holographic reconstruction on the light receiving member is a scaled version of a perimeter shape of the light receiving member.

9. A holographic projection according to claim 1, wherein a perimeter shape of the holographic reproduction on the light receiving member and a perimeter shape of the optical member are a scaled version of a perimeter shape of the light receiving member.

10. A holographic projector according to claim 1, wherein the light source is arranged to illuminate the spatial light modulator, wherein the light source emits spatially coherent light.

11. A holographic projector according to claim 1 comprising a processor coupled to the spatial light modulator to provide the computer generated hologram to the spatial light modulator.

12. A holographic projector according to claim 11, wherein the processor is configured to form the holographic reconstruction at times when a speed of the light receiving member is non-zero.

13. The holographic projector of claim 1, wherein the driver is configured to move the light receiving member on a circular trajectory.

14. The holographic projector of claim 1, wherein the driver is configured to move the light receiving member on an elliptical trajectory.

15. The holographic projector of claim 1, wherein the optical element is a mirror, wherein a footprint of the holographic reconstruction on the light receiving member defines a shape with a perimeter having a first aspect ratio and the mirror has a second aspect ratio greater than the first aspect ratio.

16. The holographic projector of claim 1, wherein the light receiving member has a diffusing angle of 5-20° in a first direction and has a diffusing angle of 10-60° in a second direction, wherein the second direction is substantially orthogonal to the first direction and the diffusing angle in the first direction is different than the diffusing angle in the second direction.

17. The holographic projector of claim 1, wherein the light receiving member has a diffusing angle in a first direction and a diffusing angle in a second direction, wherein the diffusing angle in the second direction is 1.2 to 5 times the diffusing angle in the first direction.

18. A holographic projection method comprising:
    receiving and representing a computer-generated hologram on a spatial light modulator;

spatially modulating incident light from a light source with the spatial light modulator with the representation of the computer-generated hologram thereon;

receiving the spatially-modulated light along an optical axis from the spatial light modulator on a light receiving member to form a holographic reconstruction on the light receiving member, wherein the light receiving member non-isotropically diffuses the received light by a first length in first direction of the light receiving member and diffuses the received light in a second direction of the light receiving member, perpendicular to the first direction, by a second length greater than the first length;

receiving the diffused light from the light receiving member by an optical element, wherein a dimension of the optical element in a third direction is smaller than a dimension of the optical element in a fourth direction, the fourth direction of the optical element being perpendicular to the third direction, and wherein the first direction is generally parallel to the third direction and the second direction is generally parallel to the fourth direction, and wherein the cross-sectional shape of a light cone received by the optical element from the light receiving member is matched to a cross-sectional shape of the optical element; and moving the light receiving member in a plane while maintaining an orientation of the light receiving member relative to the spatial light modulator substantially constant, wherein the light receiving member moves such that it scans a scan area on the light receiving member with the holographic reconstruction, said scan area being larger than the area on the light receiving member of the holographic reconstruction.

19. The holographic projection method according to claim 18, wherein the motion of the light receiving member is in a closed path.

20. The holographic projection method according to claim 18, wherein the motion of the light receiving member is a reciprocating motion.

\* \* \* \* \*